No. 854,355. PATENTED MAY 21, 1907.
E. W. A. HOLTZ & A. DICK.
SAW OR CUTTER GUARD FOR WOODWORKING MACHINES.
APPLICATION FILED DEC. 28, 1905.
2 SHEETS—SHEET 1.
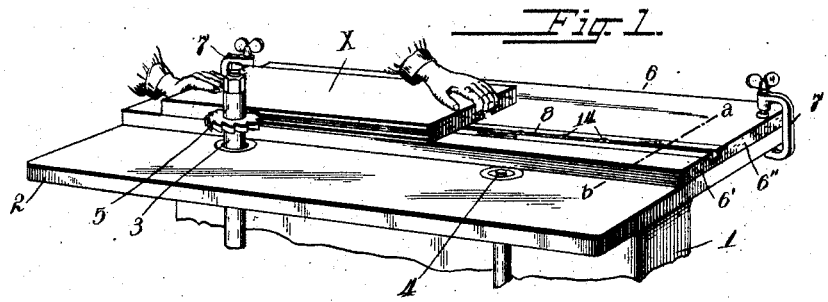
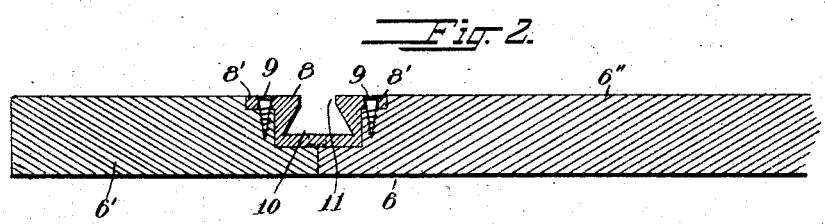
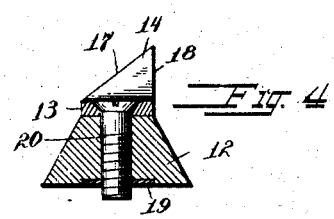
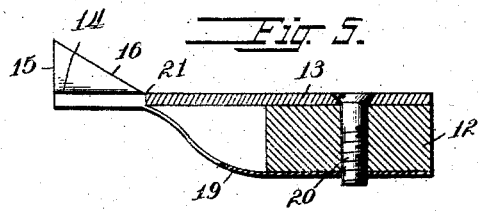
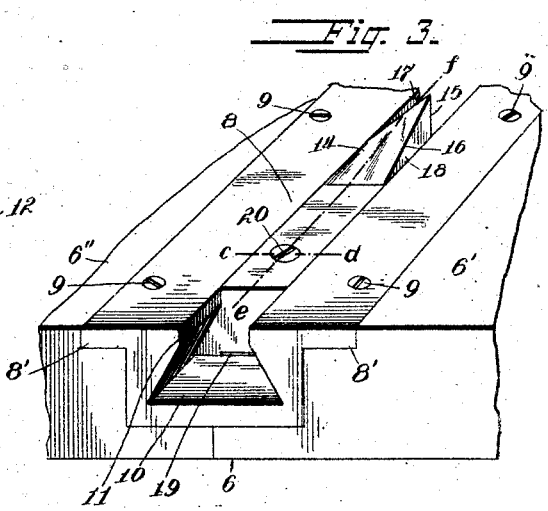
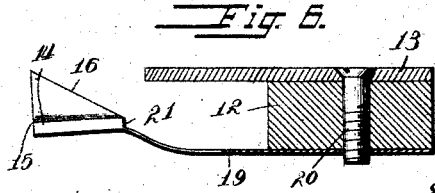
Witnesses
Milton Lenoir
Geo. W. Lamlin
Inventors
Edward W. A. Holtz
Arthur Dick
by Frank C. Gore
their Attorney

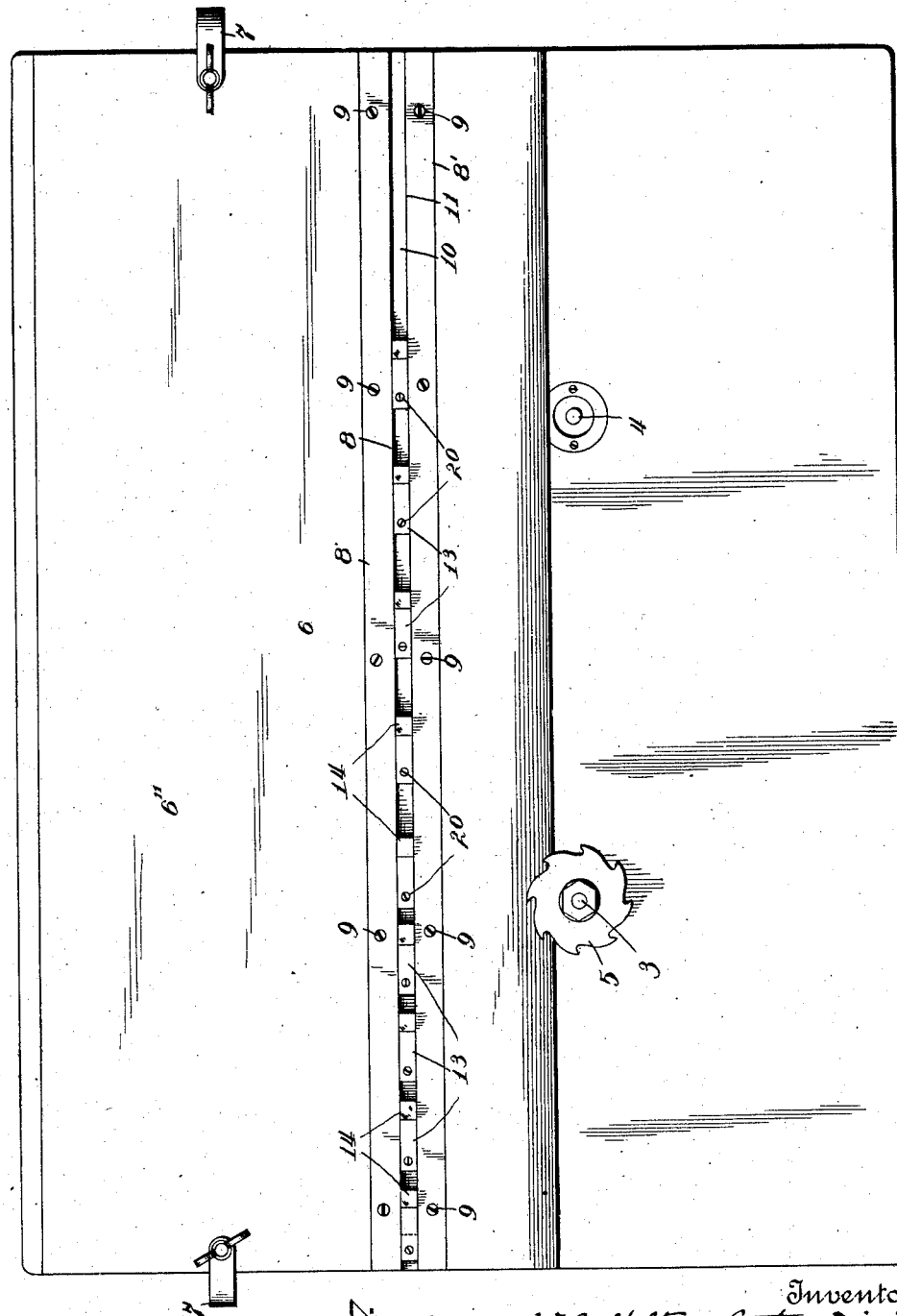

UNITED STATES PATENT OFFICE.

EDWARD W. A. HOLTZ AND ARTHUR DICK, OF EVANSVILLE, INDIANA.

SAW OR CUTTER GUARD FOR WOODWORKING-MACHINES.

No. 854,355.      Specification of Letters Patent.      Patented May 21, 1907.

Application filed December 28, 1905. Serial No. 293,668.

*To all whom it may concern:*

Be it known that we, EDWARD W. A. HOLTZ and ARTHUR DICK, citizens of the United States, residing at Evansville, county of Vanderburg, and State of Indiana, have invented certain new and useful Improvements in Saw or Cutter Guards for Woodworking-Machines, of which the following is a specification.

This invention relates to saw or cutter guards for wood-working machines.

In grooving machines, and others, employing a cutter rotating above a work-table, where the operator feeds the piece of work by hand, suitable gages being used, it happens occasionally that the rapidly rotating saw or cutter will, upon striking a knot or other hard part of the wood, suddenly jerk back the piece of wood and before the workman can recover or realize what is happening, his hand, which may be located in advance of the saw or cutter, is drawn back upon the latter and horribly mangled. Attempts have heretofore been made to protect the hands of the operator by using guards for the saw or cutter, and it has also been proposed to employ a stop to engage the wood, but so far as we are aware, these devices have not made provision for protection of the hands of the operator at any and all times, regardless of the position of the piece of wood, nor have they been so adapted to the table that they can be used when the work is fed in different directions.

The object of our invention is to obviate the defects heretofore incident to the use of saw and cutter guards and to provide an improved stop for the wood, which will permit feed of the piece in either direction of the table, allow of any desired adjustment according to circumstances and the wish of the workman, our object being also to provide an improved device, whereby as many of the novel stops can be employed and positioned as desired, and a still further object is to provide an improved and novel supplemental table on which the improved stops can be adjusted as found desirable.

With the foregoing, and other not specifically mentioned, objects in view, our invention embraces certain improved features of construction of the stop itself, the construction of the supplemental table, and the devices adapting the improved stops to the supplemental table, whereby all desired adjustments are obtainable and the operator is protected at all times.

In the accompanying drawings:—Figure 1 is a perspective view showing the table of a wood-working machine having vertical spindles for the attachment of horizontal saws or cutters, illustrating the application of our invention thereto; Fig. 2, a section on line $a-b$ of Fig. 1; Fig. 3, an enlarged detail perspective of one of the stops associated with a portion of the trackway of the supplemental table; Fig. 4, a section on line $c-d$ of Fig. 3; Fig. 5, a section on line $e-f$ of Fig. 3; Fig. 6, a section similar to Fig. 5, but illustrating the abutment depressed; and Fig. 7, a plan view of Fig. 1.

The numeral 1 designates the standard of an ordinary wood-working machine, while 2 is the horizontal table and 3 and 4 the vertical spindles which may be rotated by suitable means. A saw or cutter 5 is secured to one of the spindles. Saws or cutters can be used on both spindles.

We employ a supplemental table 6, which can be of suitable width and length and is detachably secured to the table 2 by clamps 7, which permit it to be put on or taken off table 2, and it will be understood that other supplemental tables of different widths and lengths, as found desirable, can be employed, the operator selecting the one he wishes, according to the character of the work being carried on, the length and size of the piece, etc. The supplemental table can be arranged transversely of table 2 so that the feed may be made cross-wise of table 2, if desired. The table 6 is composed of separate wooden strips 6' and 6'', which are rabbeted to receive the stop trackway 8, which is of metal and has lateral flanges 8' secured by screws 9 to the parts 6' and 6''. It will be understood that the trackway 8 extends the length of the table 6 and is sunk flush with the top thereof. The trackway 8 has its lower interior of dove-tail form throughout its length at 10, which communicates with a slot-like mouth 11.

The workman may use as many of the stops located in trackway 8 and placed as close or as far apart as he desires. These stops have a body 12 of substantially trapezoidal form and of slightly smaller size than the dove-tailed groove 10 into which they fit. Superposed on the body 12 is an abutment 13 in the shape of a narrow strip which lies lengthwise within the mouth 11 flush with the trackway 8. The stop 14 is of such width that it can be depressed into the mouth 11 and into the dove-tailed portion 10. The face 15 of the stop is disposed at right angles to the top of the table 6. The top of the stop is beveled as at 16 in Figs. 5 and 6, the direction of its length and it is also beveled as at 17 transversely, as shown in Fig. 4, which permits the feed of the piece of wood to be grooved (shown at x) either lengthwise of the table 6 or crosswise thereof and, as shown in Fig. 4, the side face 18 of the stop is at right angles to the top of table 6. Thus, whether the piece x be fed lengthwise or crosswise of table 6, if it is kicked back by the saw or cutter 5, it will strike against either face 15 or face 18, as the case may be, and prevent the forward hand of the workman from being drawn back to the saw or cutter. The stop 14 is secured to the free end of a leaf spring 19 which lies within the groove 10 and normally keeps the stop in the position shown in Fig. 5, that is, raised above the level of table 6, said stop being capable of depression by the sliding of the piece x thereover either transversely or longitudinally of the table 6 and of the stop, in which case it assumes the position shown in Fig. 6, but immediately snaps up to the position shown in Fig. 5 when the rear end of the piece x has passed over it, so that as the piece x is fed forward by the workman, the stops 14 are successively released and fly up into guarding position, and there is, therefore, always one of them very close to the rear end of the piece x. A screw 20 passes through the abutment 13, the body 12, and the spring 19 and is intended to bear against the bottom of the dove-tailed groove 10 to tightly hold the body 12 wedged up against the side walls of the trackway, in which position the head of the screw 20 is flush with the top of the abutment 13. By releasing the screw, the stop can be slid along to any position and secured where desired. The operator may use as many of the stops as he thinks desirable in the trackway 8 and can position them wherever he prefers. In feeding the piece x in the direction of the arrow in Fig. 1, the stops at the rear of its rear end will successively rise so that if the piece is kicked back by the saw 5, it will meet a stop and can go no farther, thus saving the advance hand of the workman from being drawn upon the saw and badly mutilated.

Where the stop 14 and abutment 13 are juxtaposed at the point 21, they have upright or vertical surfaces so that as the piece x strikes the stop 14, the abutment 13 takes up the shock and thus the spring 19 is relieved of the shock, and damage to said spring is prevented.

Having thus described our invention, what we claim as new and desire to secure by Letters Patent, is:—

1. The combination with the feed table of a wood working machine in which the work is manually pushed past a rotating cutter, of a yieldable stop projecting from the table in the path of the work arranged to yield and be depressed by said work and adapted to spring up behind the work to prevent accidental throwing back of the work by the tool.

2. The combination with the feed table of a wood working machine in which the work is manually pushed past a rotating cutter, of a plurality of yieldable automatically upwardly projecting stops positioned at different points along the line of the feed of the piece of work and so formed as to yield and be successively depressed by the work as it moves forward in a given direction and released and spring up behind the work to prevent accidental throwing back of the work by the tool.

3. The combination with the feed table of a wood working machine in which the work is manually pushed past a rotating cutter, of an open trackway over which the work is adapted to slide, and a yieldable stop adjustable to different positions in said trackway and arranged to yield and be depressed by said work and adapted to spring up behind the work to prevent accidental throwing back of the work by the tool.

4. The combination with the feed table of a wood working machine in which the work is manually pushed past a rotating cutter, of a trackway having an under-cut groove open along its top and over which the work is adapted to slide, a stop comprising a body located in the under-cut portion of the trackway and slidable to different positions, an upwardly projecting stop arranged to yield and be depressed by the work into the trackway and adapted to spring up behind the work to prevent accidental throwing back of the work by the tool, a spring adapted to project the stop upwardly, and a screw for securing the body in the trackway.

5. The combination with the feed table of a wood working machine in which the work is manually pushed past a rotating cutter, of a trackway open along its top over which the work is adapted to pass, and a plurality of yieldable spring-raised stops projecting upwardly from the trackway and having beveled tops and squared under faces and arranged to yield and be depressed by said work and adapted to spring up behind the work in succession to prevent accidental throwing back of the work by the tool.

6. In a saw or cutter guard, for wood-working machines, the combination with the table thereof, of a plurality of spring-raised stops disposed in the direction of the general line of feed of the work and having squared sides and ends and beveled longitudinally and transversely on their tops, said stops being adapted to be released after passage of the piece of work thereover.

7. The combination with the feed table of a wood working machine in which the work is manually pushed past a rotating cutter, of a supplemental table detachably secured to the feed table, and a yieldable stop projecting from the supplemental table in the path of the work arranged to yield and be depressed by said work and adapted to spring up behind the work to prevent accidental throwing back of the work by the tool.

8. The combination with the feed table of a wood working machine in which the work is manually pushed past a rotating cutter, of a supplemental table detachably secured on the feed table, and a plurality of yieldable stops arranged in succession on the supplemental table in the path of the work which are adapted to yield and be depressed by said work and adapted to spring up behind the work to prevent accidental throwing back of the work by the tool.

In testimony whereof, we hereunto affix our signatures in presence of two witnesses.

EDWARD W. A. HOLTZ.
ARTHUR DICK.

Witnesses:
F. M. HOSTETTER,
F. C. GORE.